M. P. Norton,
Hand Stamp.
No. 4144. Reissued Oct. 4. 1870.
Fig. 1.
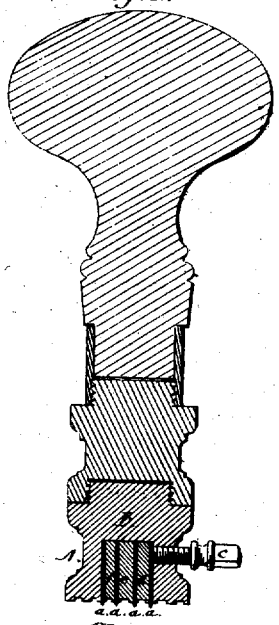
Fig. 2.
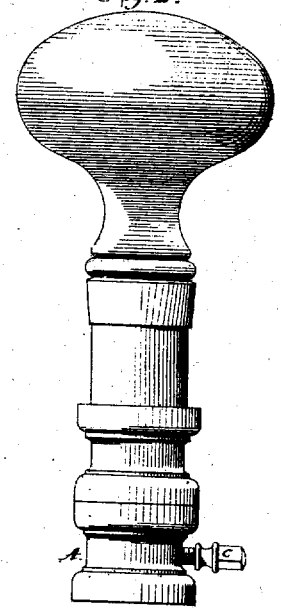
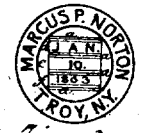
Fig. 3.
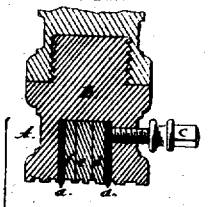
Fig. 5.
Fig 5.
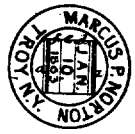
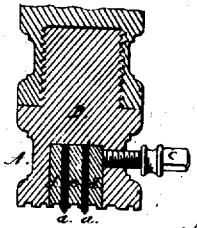
Fig. 6.
Fig. 6.
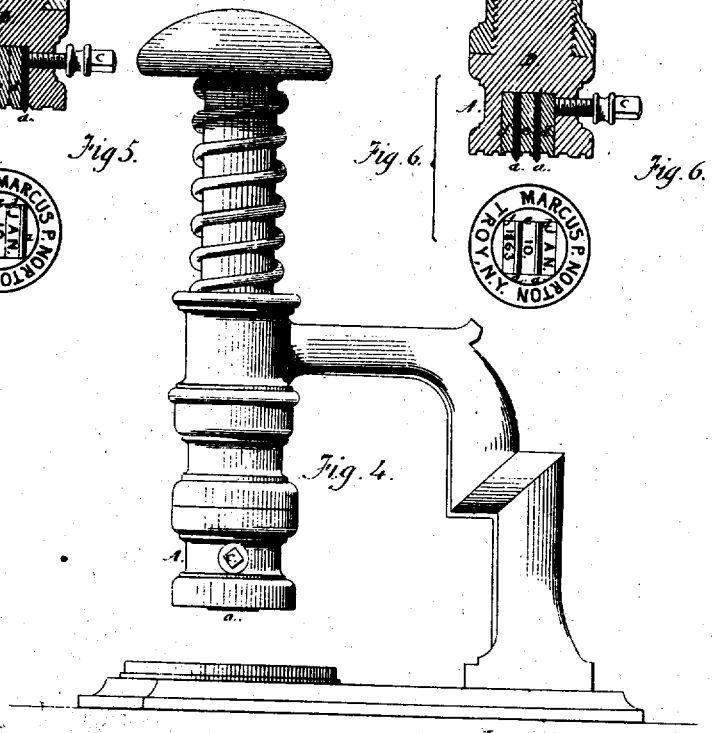
Fig. 4.
Witnesses;
Edw. W. Down
John F. C. Preinkert
Inventor;
Marcus P. Norton

UNITED STATES PATENT OFFICE.

MARCUS P. NORTON, OF TROY, ASSIGNOR, BY MESNE ASSIGNMENTS, TO THE SECOMBE MANUFACTURING COMPANY, OF NEW YORK, N. Y.

IMPROVEMENT IN HAND CANCELING-STAMPS

Specification forming part of Letters Patent No. 38,175, dated April 14, 1863; Reissue No. 1,748, dated August 23, 1864; Reissue No. 3,586, dated August 3, 1869; Reissue No. 4,144, dated October 4, 1870.

DIVISION B.

*To all whom it may concern:*

Be it known that I, MARCUS P. NORTON, of the city of Troy, in the county of Rensselaer and State of New York, have heretofore invented certain new and useful improvements in a device or machine for printing, for dating upon, and for canceling internal-revenue stamps of value, by cutting, puncturing, or piercing them at the same time and operation of printing or forming the date thereon, in the manner and by the means substantially as herein described and set forth, which said invention, after having been duly sold, assigned, and transferred to HELEN M. INGALLS, of said city of Troy, county and State aforesaid, by deed of assignment dated on the 9th day of August, 1870, and duly recorded in the United States Patent Office on the 9th day of August, 1870, in Liber $H^{13}$, page 132, of Transfers of Patents; and the same was thereafter duly sold, assigned, and transferred by her, the said HELEN M. INGALLS, to the LECOMBE MANUFACTURING COMPANY, of the city, county, and State of New York, by an instrument in writing bearing date on or about the 29th day of August, 1870, and which was duly recorded in the United States Patent Office on the 31st day of August, 1870, in Liber $W^{12}$, page 388, of Transfers of Patents. Now, therefore, I, the said MARCUS P. NORTON, do hereby declare the following to be a full, clear, and exact description of the nature, construction, and operation of the same, reference being hereby had to the accompanying drawings, and to the letters of reference marked thereon, which drawings, so marked and lettered, make a part of this specification of my said invention and improvements for the cancellation of internal-revenue stamps, and now owned by the SECOMBE MANUFACTURING COMPANY, as before stated and set forth.

Like letters represent and refer to like or corresponding parts upon the accompanying drawings, made in one sheet, and marked "Division B," and which are a part of this specification.

Figure 1 is a vertical section on a line through or near the center of the canceling device or machine herein described and set forth. Fig. 2 is a side elevation and view of the same machine. Fig. 3 is a plan or face view of the said device or machine or invention, showing the printing, forming, or dating, and the cutting or puncturing parts, device, and devices. Fig. 4 represents an ordinary stationary frame to receive and contain such printing or dating and cutting parts or device or devices. Fig. 5 shows a face or plan view and a vertical section on a line crosswise the cutting canceling device at or near the center of the machine or device herein described and set forth, showing the type or device for printing or forming the date upon the revenue-stamp arranged between and combined with the outside cutting, puncturing, or piercing devices. Fig. 6 shows a plan or face view and a vertical section on a line substantially the same as described under Fig. 5, and showing the cutters, knives, or canceling device used for cutting, puncturing, or piercing the revenue-stamp arranged between the type or device for printing or forming the month, the day of the month, and the year upon said revenue-stamp.

The nature of my said invention and improvements consists in the employment of cutters, knives, or cutting canceling device constructed of any width, thickness, or length required for cutting, puncturing, or piercing the internal-revenue stamp in one or more places or in such place or places as may be desirable, and so arranging and combining the same with the type or device for the date as to print, or form the month, the day of the month, and the year, or the date, upon such revenue-stamp at the same time and operation of such cutting, puncturing, or piercing thereof for the cancellation, thus and thereby securing a more perfect and permanent cancellation of the revenue-stamp, with the date of the same printed or formed thereon in a plain and intelligible manner, in the midst of, or outside of, or between such cuts, piercings, or punctures, substantially as herein shown, described, and set forth, so as to prevent frauds upon the Government by or from a second or reuse of the same, after having been once used in payment of the Government tax as by law required.

To enable others skilled in the art to which my said invention relates to make and use the same, I will here proceed to describe the construction and the operation of the same, which is substantially as follows, to wit:

A, Figs. 1, 2, and 3, represents a device or machine for containing and firmly holding the cutting, canceling, and dating devices herein described and specified, and it may be of any desired diameter or size whereby the better to carry into successful operation my said invention. The said cutting, puncturing, or piercing device, or cutters, or knives *a* are arranged and combined with the type or dating device or devices for the printing or forming of the month, the day of the month, and the year, or the date, either between and outside of the same, as shown; or such cutters, knives, or cutting canceling device may only be arranged outside of the said type or dating device; or the same may be arranged immediately between such dating type or device; or the same may be arranged in a close and parallel line with the dating type or device; or the said dating type or device may be arranged with such cutting, puncturing, or piercing device or parts so that some of the knives or cutters will be outside of and other ones between the said type, as may be the most efficient and successful in canceling the said revenue-stamp. The said cutting canceling device should be made of fine cast-steel, and it may be made in one or more parts, cutters, or knives, and then arranged with the dating type or device substantially in the manner herein described and set forth. Such cutters, knives, or cutting canceling device have sharp edges constructed upon the lower end thereof, by which the cutting, puncturing, or piercing of the revenue-stamp is thoroughly done at the same time and operation of printing or forming the date upon the same for the cancellation of such stamp, and giving and showing thereon the date of that cancellation.

At Figs. 1, 3, 5, and 6 of the accompanying drawings, *d* is the type for the month, *e* is the type for the day of the month, *f* is the type for the year, and *a*, same figures, is the cutting device for cutting, puncturing, or piercing the said revenue-stamp, thereby canceling it when or at the time the date thereof is printed, or formed, or impressed upon it, substantially as herein described and set forth.

In any and every modification of my said invention shown or described the cutting, puncturing, or piercing device or devices will be so arrranged and combined with the dating type or device as to cancel the revenue-stamp upon its exposed surface by the union of those devices at the same time and operation of the entire machine.

When the said revenue-stamp shall have been canceled by the use or means of my said invention, device, or canceling-machine, it will be cut, punctured, or pierced in one or more places, and the date will have been formed thereon at the same blow or operation of the machine, substantially as shown by the accompanying drawings, and as herein described and set forth, cutting through the revenue-stamp, and into or through the paper to or upon which it shall have been affixed in the usual manner of affixing revenue-stamps to paper or documents in payment of the Government tax. Such cancellation will prevent frauds upon the Government revenue from or by a second or reuse of the revenue-stamp as the cutting, or puncturing, or piercing and the dating of and upon the same will greatly discourage any illegal or unlawful use of the revenue-stamp once used as by law provided; and if the same shall have been used a second time, or reused in any form, the same will be detected and exposed by reason of and on account of the aforesaid mode or manner of the cancellation of such revenue-stamps.

Each and every part or device contained in my said machine and invention, and hereinbefore mentioned and specified, must be constructed of proper and durable material, and of such size and strength as shall the most successfully carry out and into operation my invention and improvements hereinbefore named and set forth.

The aforesaid canceling and dating apparatus, having suitably-constructed knives or cutters, and type or dating device united and combined into one device or machine for the purpose of canceling revenue-stamps by cutting and dating upon the exposed or upper surface of the said stamp, may have surrounding the same the name of any person, office, bank company, business firm, officer, or corporation, so as to print or form upon the revenue-stamp such name as shall perform the work of such cancellation, substantially as shown at Figs. 3, 5, and 6 of the accompanying drawings.

The machine, device, or instrument afore described is operated by a downward blow or force of the same upon the immediate and exposed surface of the revenue-stamp. But one blow or operation of such machine or device will be required to secure the aforesaid cancellation; still, however, more than one blow or operation of such machine may be given, if found necessary to do perfect work, as contemplated and provided in or by the construction or manufacture of my said machine, invention, or device.

The above-described cancelling and dating device, so constructed and combined, may be arranged for practical use and operation in any suitable manner, and the same inked for such use by means of a suitable roller passing over the surface of the same in any usual and well-known manner; or the same may be inked for use by means of a chemically-prepared inked ribbon in the usual and well-known manner; or the same may be inked for use in any other suitable manner, and by any suitable and convenient means.

Having thus described my invention and improvements, what I claim, and desire to secure by Letters Patent of the United States of America, is—

In an internal-revenue-stamp-canceling device or machine, the arrangement and combination of cutters or knives (or cutting canceling device) with the dating, printing, or forming type or device, substantially as shown and described, so as to cancel revenue-stamps by cutting, puncturing, or piercing the same, and by the printing or forming the date thereon, in the manner substantially as herein specified and set forth.

In testimony whereof I have, on this 14th day of September, 1870, hereunto set my hand in the presence of two witnesses.

MARCUS P. NORTON.

Witnesses:

FREDK. KOONES,

EDW. W. DONN.